(12) United States Patent
Kalidindi et al.

(10) Patent No.: US 11,120,034 B2
(45) Date of Patent: Sep. 14, 2021

(54) AUTOMATIC ROUTING OF CONNECTION REQUESTS IN BUSINESS INTELLIGENCE (BI) TOOLS

(71) Applicant: SAP SE, Walldorf (DE)

(72) Inventors: Sowmya Kalidindi, Bengaluru (IN); Sathya G, Ernakulam (IN); Vignesh Sankaran, Palani (IN); Prasanna Bhat Mavinakuli, Sagar Tq. (IN)

(73) Assignee: SAP SE, Walldorf (DE)

( * ) Notice: Subject to any disclaimer, the term of this patent is extended or adjusted under 35 U.S.C. 154(b) by 249 days.

(21) Appl. No.: 16/189,135

(22) Filed: Nov. 13, 2018

(65) Prior Publication Data

US 2020/0151169 A1    May 14, 2020

(51) Int. Cl.
*G06F 16/248* (2019.01)
*G06F 16/242* (2019.01)
*G06Q 10/06* (2012.01)

(52) U.S. Cl.
CPC ........ *G06F 16/248* (2019.01); *G06F 16/2425* (2019.01); *G06Q 10/06315* (2013.01)

(58) Field of Classification Search
None
See application file for complete search history.

(56) References Cited

U.S. PATENT DOCUMENTS

| | | | | |
|---|---|---|---|---|
| 7,945,589 | B1* | 5/2011 | Weiss | G06F 8/71 707/795 |
| 2002/0107957 | A1* | 8/2002 | Zargham | G06Q 10/06 709/224 |
| 2008/0005054 | A1* | 1/2008 | Kurian | G16H 10/60 706/52 |
| 2010/0191718 | A1* | 7/2010 | Coriell | G06F 16/283 707/714 |
| 2012/0096057 | A1* | 4/2012 | Cameron | G06F 16/164 707/825 |
| 2013/0124483 | A1* | 5/2013 | Furuhashi | G06F 16/258 707/661 |
| 2013/0304799 | A1* | 11/2013 | Lutter | G06F 16/24524 709/203 |
| 2014/0214897 | A1* | 7/2014 | Zhu | G06F 16/2455 |
| 2019/0220331 | A1* | 7/2019 | Duggal | G06F 9/542 |

* cited by examiner

*Primary Examiner* — Christopher J Raab
(74) *Attorney, Agent, or Firm* — Buckley, Maschoff & Talwalkar LLC

(57) ABSTRACT

A method and system including one or more data sources; a memory storing processor-executable process steps; and a processor to execute the processor-executable process steps to cause the system to: initiate a business intelligence (BI) tool; connect to a BI platform; receive selection of an initiate query control; retrieve one or more database coupling components, wherein each database coupling component corresponds to a data source; display the retrieved one or more database coupling components; and receive selection of at least one of the retrieved one or more database coupling components to provide data in response to execution of a query. Numerous other aspects are provided.

18 Claims, 10 Drawing Sheets

AUTOMATIC ROUTING OF CONNECTION REQUESTS IN BUSINESS INTELLIGENCE (BI) TOOLS

BACKGROUND

Self-service business intelligence (BI) is an approach to data analytics that enables users to access and work with data even if they do not have a background in statistical analysis, business intelligence or data mining (e.g., non-technical user). A self-service BI task may be a data analytic task a user carries out himself, instead of passing it on to a information technology group for fulfillment. Different BI tools may be used to analyze and visualize data, and then decisions may be made based on the analysis. The BI tool may be used by non-technical users to analyze existing data which is stored in different formats in different databases. Conventionally a self-service BI tool may consume connection server software that connects the BI tool to the different datasources (e.g., databases) to acquire the data from different datasources (e.g., databases). However, the connection server software is conventionally bundled with installation software for the BI tool, making the bundle relatively large.

Systems and methods are desired which support more efficient connection between a self-service BI tool and a datasource that avoids consumption of the connection server software by the BI tool.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

A user may use self-service business intelligence (BI) tools to analyze and visualize data, and then make decisions based on the analysis. Self-service BI tools are software that may be used by non-technical and technical users for analyzing the existing data which is stored in different formats in different databases. Conventionally, each database vendor/owner provides a piece of software called a database driver. The database driver may implement a client-server protocol specific for a given database, where the protocol allows a client of the database store/retrieve data from the database. Conventionally, there are different processes to connect the self-service BI tool ("BI tool") to the different data sources. The BI tool may act as a thick client, in that it may operate without the help of a server, as any database access driver may be stored within the BI tool (making it "thick"). As used herein, the terms "database driver," "database access driver," "database coupling component" may be used interchangeably. Conventionally, to support the connection of the BI tool to different databases via database drivers, for example, connection server software may be used in the BI tool. For example, the connection server software and related configuration details, as well as corresponding Java ARchive (JAR) files provided by different database owners, may be bundled with corresponding JAR software, as part of the installation of the BI tool, making the overall BI tool size "thick".

Figure 1:
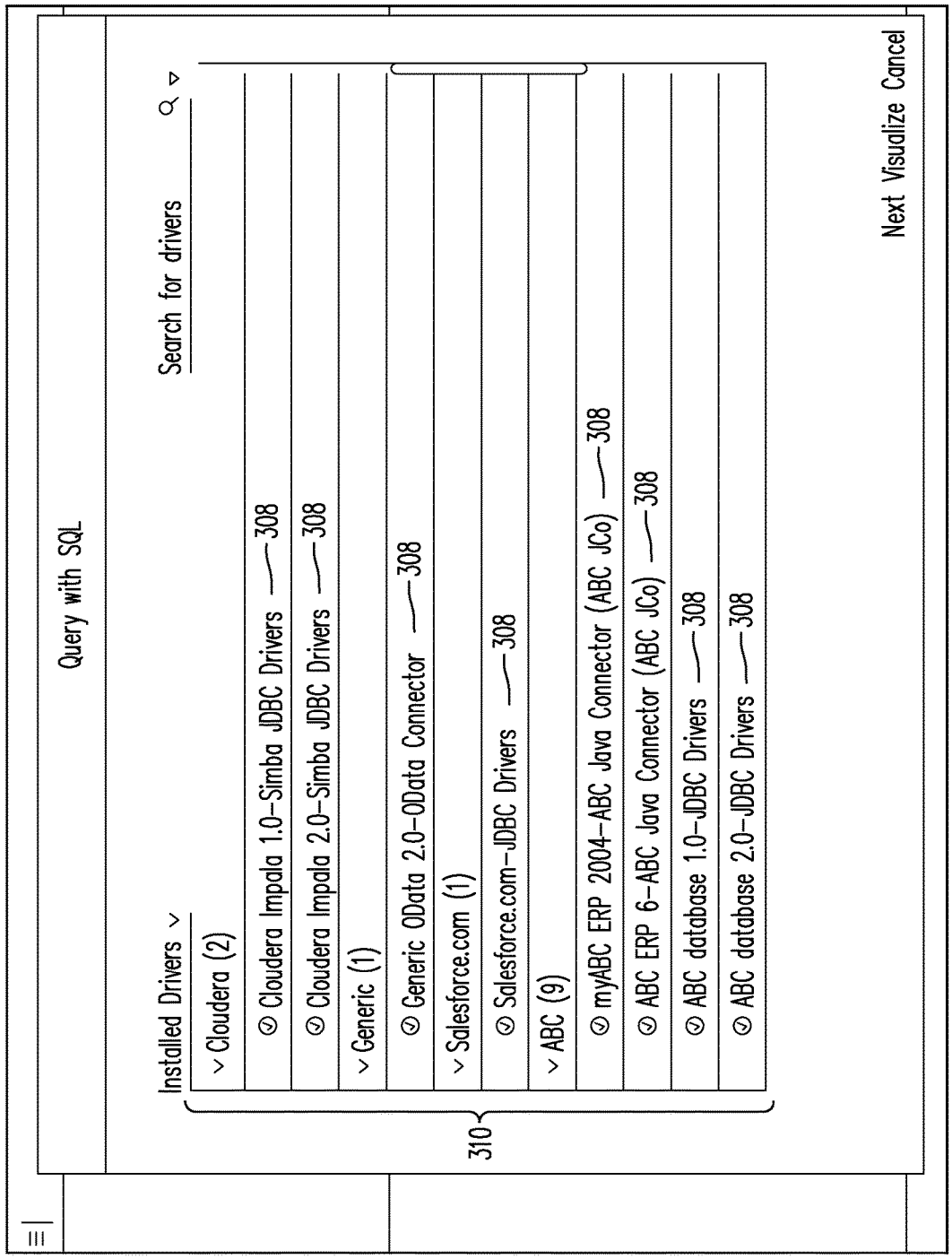
FIG. 1 is a prior art user interface.
Figure 2:
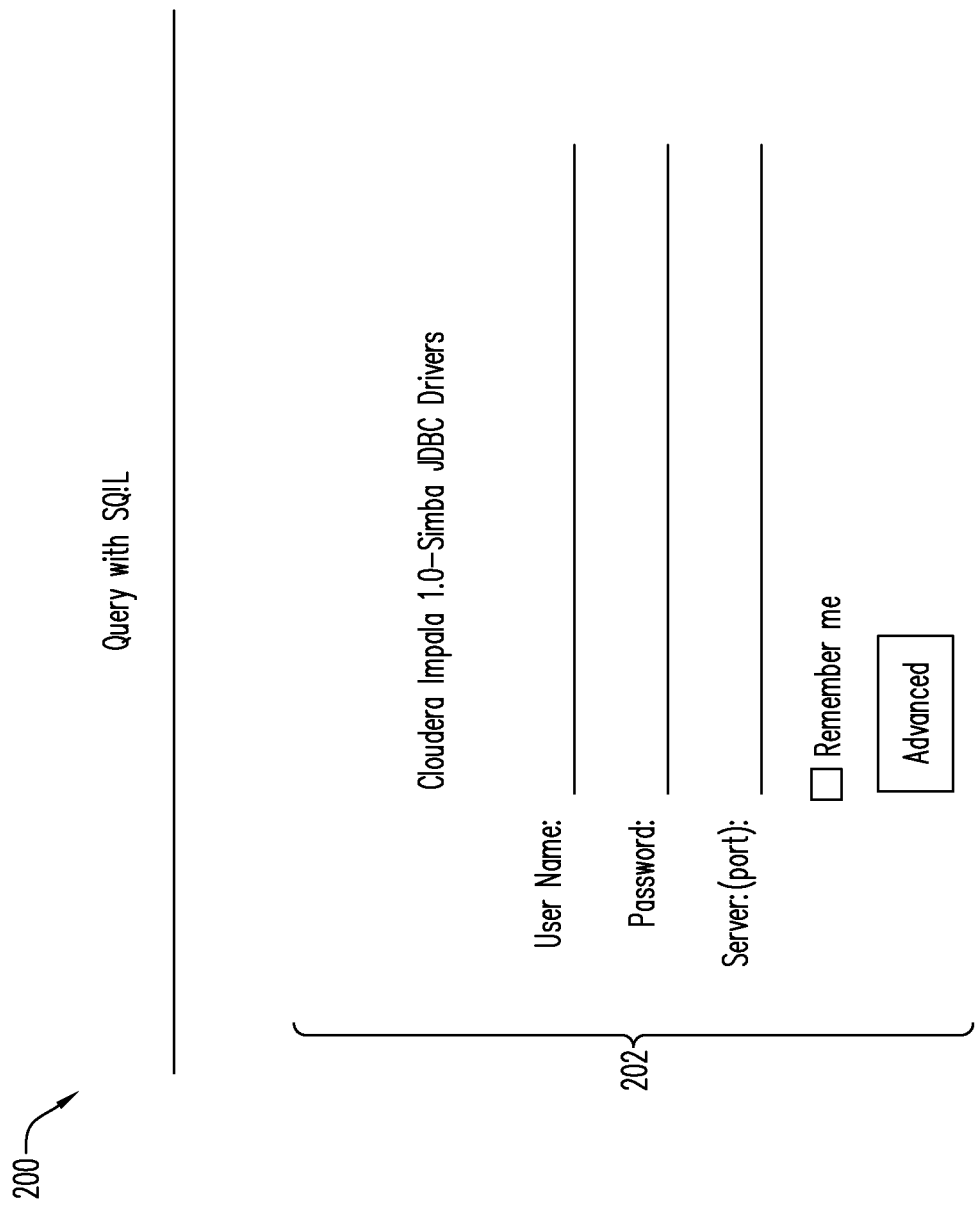
FIG. 2 is a prior art user interface.
Figure 3:
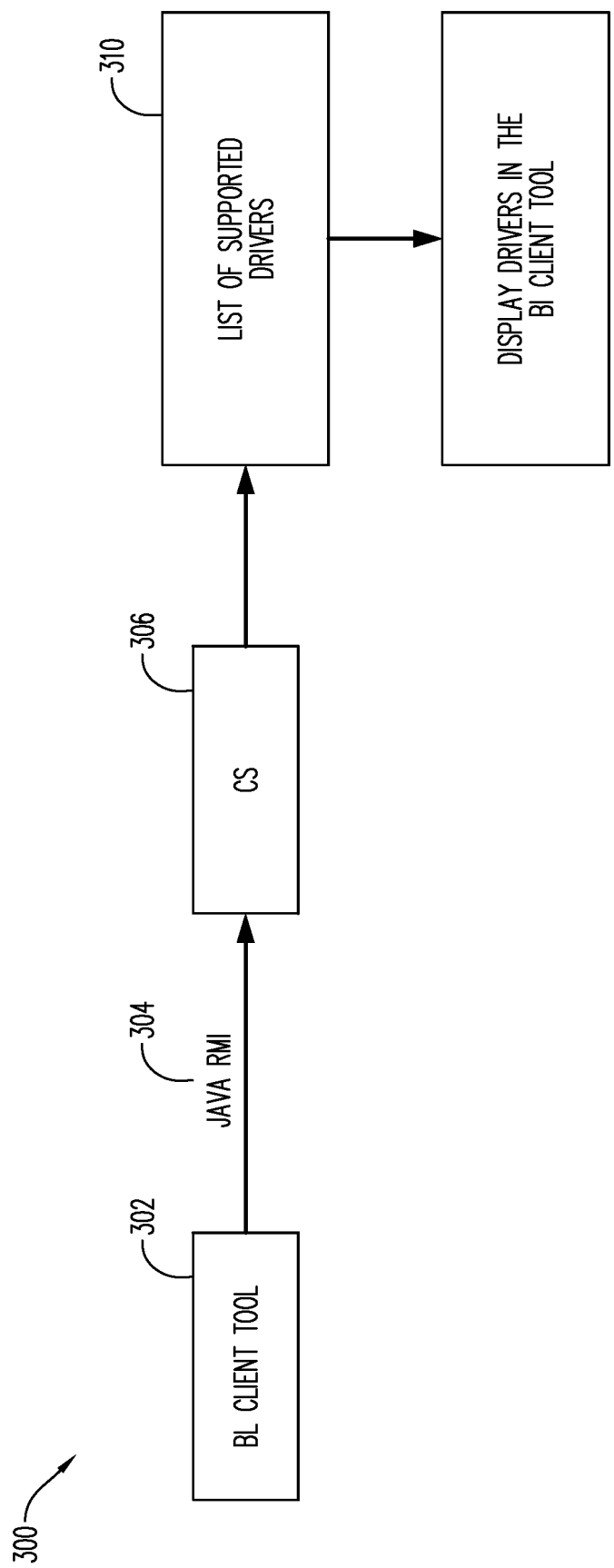
FIG. 3 is a prior art block diagram.
Figure 4:
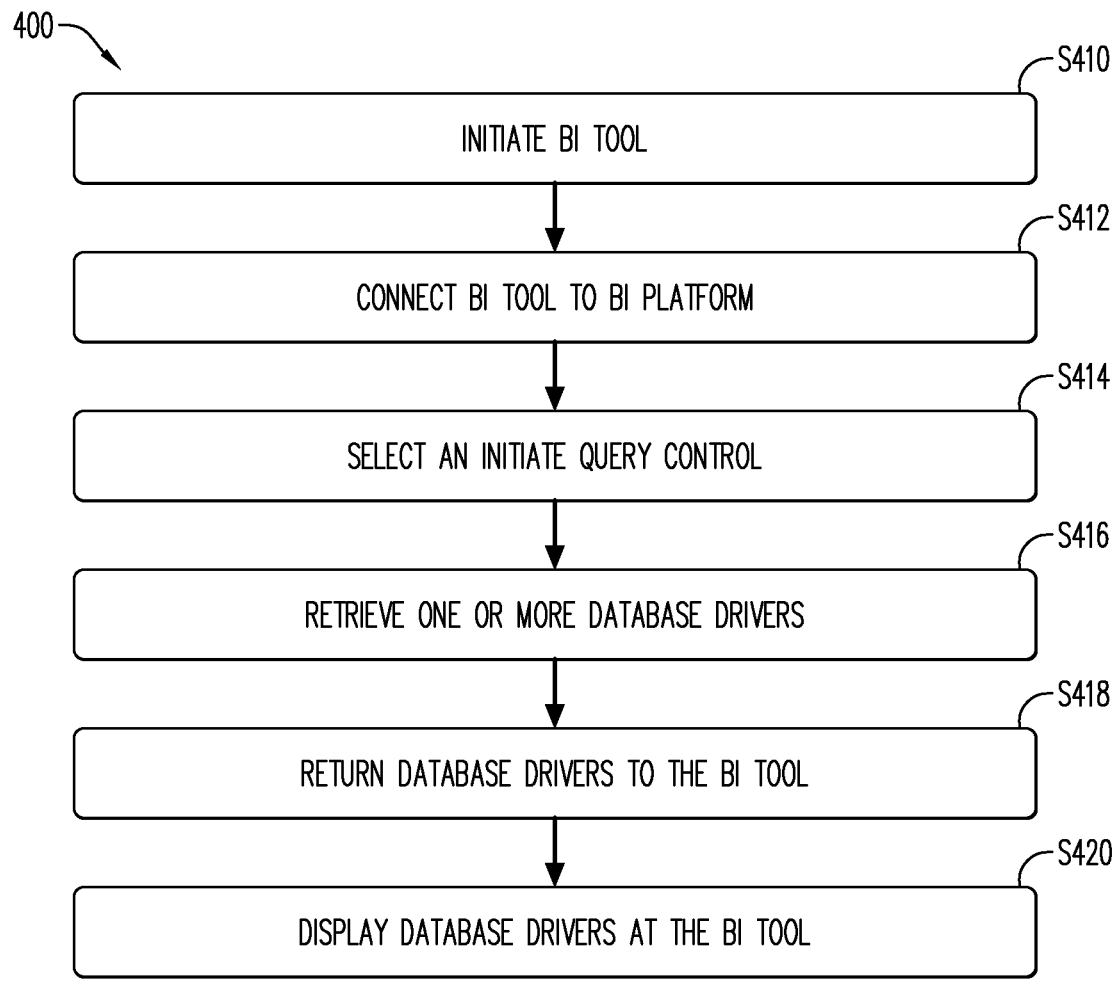
FIG. 4 is a flow diagram of a process according to some embodiments.

FIGS. 1-3 provide a non-exhaustive conventional "prior art" example of how a BI tool can conventionally connect to different databases. A user (not shown) opens a BI tool 302 (FIG. 3) and may be presented with a user interface (not shown) that includes one or more controls. The user may then select "Query with SQL" control or other control to initiate the database selection process 300. The user selection may activate a JAVA Remote Method Invocation (RMI) call 304 to retrieve a list of database drivers 310 from a local installation path. The JAVA RMI call 304 may transmit a request for supported database drivers 308 to a connection server (CS) 306. The connection server 306 may connect an application (e.g., a BI tool) to different databases with the help of database drivers 308 provided by different database owners. The connection server 306 may, in turn, retrieve a list of supported database drivers 310 from connection supported drivers in the installed version. The list of supported database drivers 310 may then be transmitted to the BI tool 302, and displayed on a user interface (UI) provided by the BI tool 302. For example, the user interface 100 shown in FIG. 1 displays the list of all the database drivers 310 that may be available to connect to a corresponding database to retrieve the data in response to a query. Next, the user may select at least one database driver 308 from the list of database drivers 310. The CS 306 includes the appropriate code to invoke the user selection, and then the user interface 200 (FIG. 2) may be displayed. The user may enter their log-in credentials 202 (e.g., user name, password, etc.) to connect to the database 910 (FIG. 9) via the selected database driver 308, and a query may be executed to retrieve data from the database 910. In the non-exhaustive example shown in FIG. 2, the selected database driver 308 is "Cloudera Impala 1.0—Simba JDBC Drivers."

While these conventional processes do connect the BI tool to different data sources, they do so with an increased size of a thick client installation software, as compared to embodiments described below. It is also noted that because of the nature of a thick client, the BI tool loses the connection-server related advantages on security, transportability, etc. that may be provided by one or more embodiments described below. Additionally, conventional BI tools use the plug-in generated by the connection server, and the database drivers or versions of the database drivers provided by the connection server may not be compatible with database driver versions on an enterprise server, for example. Also, conventionally, enterprise software content is duplicated in the BI tool, which may increase storage/maintenance costs. When the connection server does not provide a particular database driver desired by the user, the conventional BI tool may need to implement the install/uninstall feature for these drivers to acquire the appropriate driver. It is noted that when the database drivers are different (e.g., the version on the enterprise server is not compatible with the version on the connections server), the database drivers may not function properly and may not access the databases as intended. As part of a conventional install, there may be a need to maintain the two copies of the driver in both the BI tool and the enterprise server.

Some embodiments may include an application ("app"). As used herein, the term "app" refers to a self-contained program or piece of software designed to fulfill a particular purpose.

In one or more embodiments, a middleware architecture is used to implement the connection server, whereby the connection server is integrated with a BI platform server. The BI tool may then connect to the connection server via the BI platform server using the middleware architecture. The middleware architecture may be software which lies between an operating system and the applications running on it, and acts as a translation layer to enable communication and data management for distributed applications, and, in one or more embodiments, connecting the BI tool and the connection server together so data and databases may be easily passed therebetween via the middleware. As a non-exhaustive example, the middleware software may be a Common Object Request Broker Architecture (CORBA), or any other suitable middleware software able to provide interoperability among distributed objects. CORBA is a design specification for an Object Request Broker (ORB), where an ORB may provide for distributed objects to communicate with one another, whether locally or on remote devices, written in different languages, or at various locations on a network. Applicants note that the middleware architecture may provide the following features: language independent (e.g., software is not limited to a particular software language), operating system independent (e.g., available in JAVA, which is operating system independent), technology independent (e.g., provides for the normalization of interfaces between various new and legacy systems. As a non-exhaustive example, a database wrapped by a server can have its database schema change for the sake of improved disk usage without affecting the external interfaces), data typing (e.g., provides a mechanism to ensure that user-code conforms to method-names, return-, parameter-types, and exceptions), high tunability (e.g., implementations have options for tuning the threading and management features), freedom from data transfer details (e.g., when handling low-level connection and threading, provides a high level of detail in error conditions), ability to compress data.

It is noted that since the BI tool uses the BI platform to access the CS, the BI tool may use the technology, safety and security provided by the BI platform. As some non-exhaustive examples of using the features of the BI platform, the BI tool using the connection server software from the BI platform, instead of using the duplicated CS software directly, may decrease the size of the BI tool install, as the installation program for the BI tool may not need to include the JAR files (which may be beneficial as two copies of JAR files do not need to be maintained); the BI tool and at least one of the connection server and enterprise server may have compatible versions of drivers because they are being supplied by the BI platform; install/uninstall of database drivers may not be specifically required in the BI tool, as both the BI tool and enterprise server may point to the connection server on the BI platform; an administrator of the BI platform may control which database drivers are displayed in the BI tool, such that the database drivers that are displayed are the ones that may be available; consumption of the database drivers from the BI platform is more secure than from thick client way because in thick client way there is always a duplicate and a human element involved which is removed in one or more embodiments; there may be seamless interoperability for documents between the BI tool and the enterprise server; maintenance costs may be less.

FIGS. 4-7 include a flow diagram of process 400 (FIG. 4) described with respect to block diagrams 500/600 and an outward view of user interfaces 700 and 800 according to some embodiments. Process 400 may be executed by application server 930 according to some embodiments, e.g., by execution of the BI tool 502 to provide a user with access to the user interfaces 700/800. In one or more embodiments, the application server 930 may be conditioned to perform the process 400, such that a processor 1010 (FIG. 10) of the server 930 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 700 may be presented on any type of display apparatus (e.g., desktop monitor, smartphone display, tablet display) provided by any type of client device (e.g., desktop system, smartphone, tablet computer). The application which is executed to provide user interface 700 may comprise a Web Browser, a standalone application, or any other application. Embodiments are not limited to user interface 700 of FIG. 7.

Figure 9:
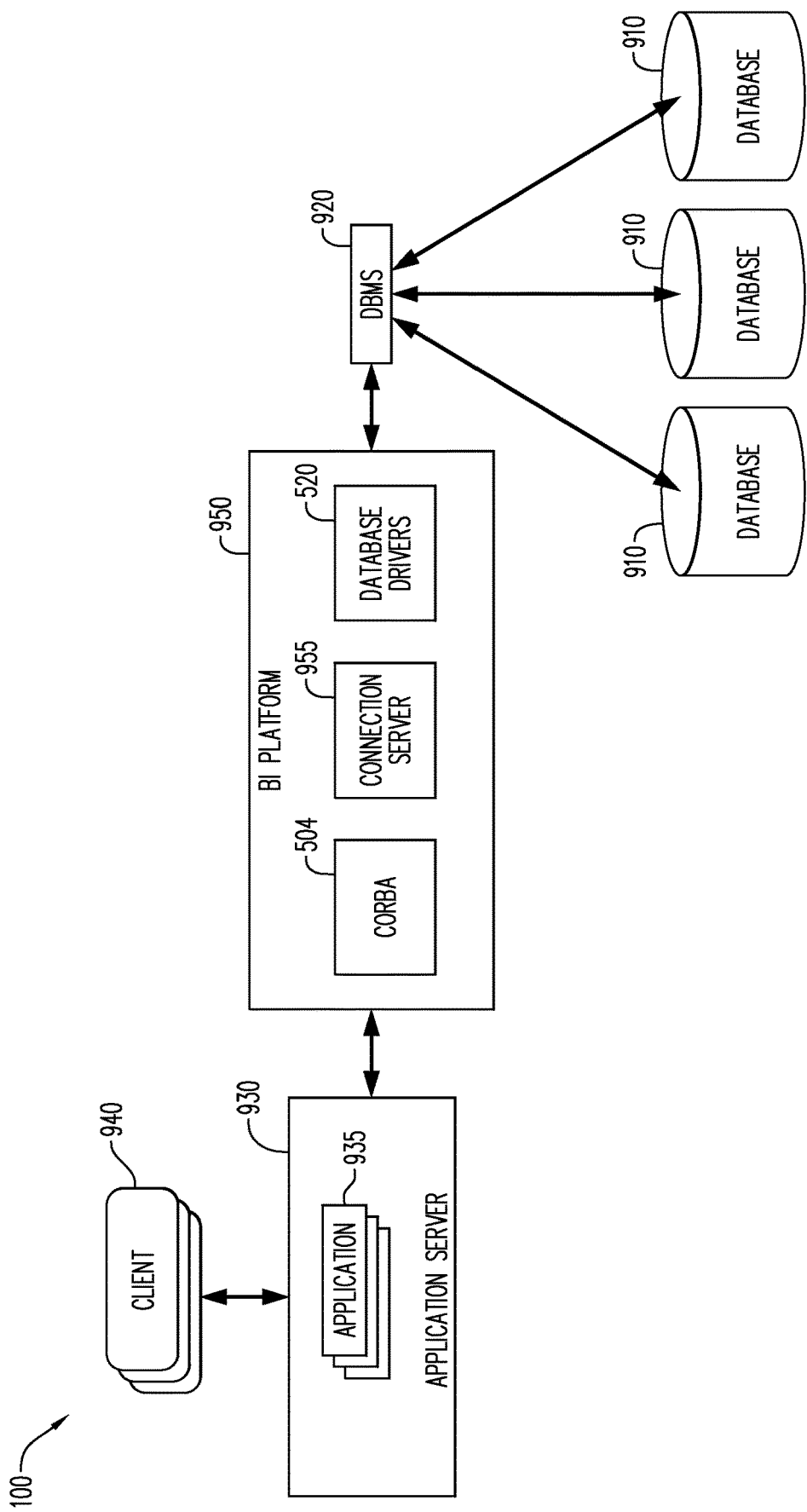
FIG. 9 is a block diagram of a system according to some embodiments.

Prior to the start of the process 400, the possible database drivers 520 may be input to, and stored on, a BI platform 950 (FIG. 9). In one or more embodiments, the BI platform 950 may be containerized, whereby a container includes an entire runtime environment (e.g., BI platform and its dependencies).

Initially, at S410, a user (not shown) initiates a BI tool 502 (e.g., Lumira by SAP®) to retrieve data from one or more data sources. Any suitable BI tool may be used. Additionally, while a database, and more particularly, a database table, may be used as an example of a data source, any other suitable data source may be used. Initiation of the BI tool 502 may invoke Representational State Transfer (REST) webservices 602 to allow a client (e.g., in this case CORBA layer) to exchange information with the BI tool 502 via a standardized interface and protocol. The REST webservices may provide a uniform interface using standard HTTP operations (such as GET, POST, PUT, etc.) and exchange representations of resources.

Figure 7:
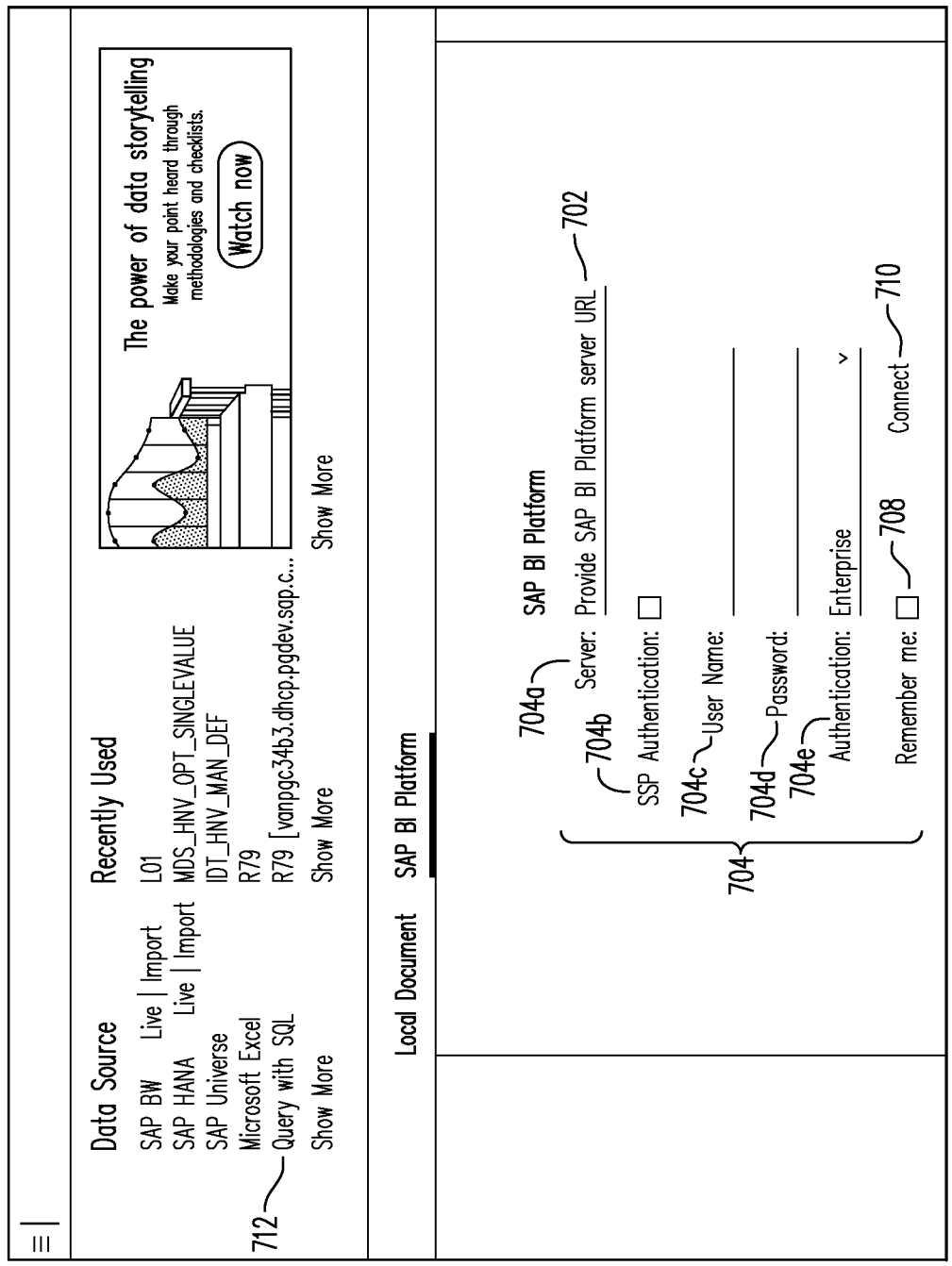
FIG. 7 is an outward view of a graphical interface according to some embodiments.
Figure 8:
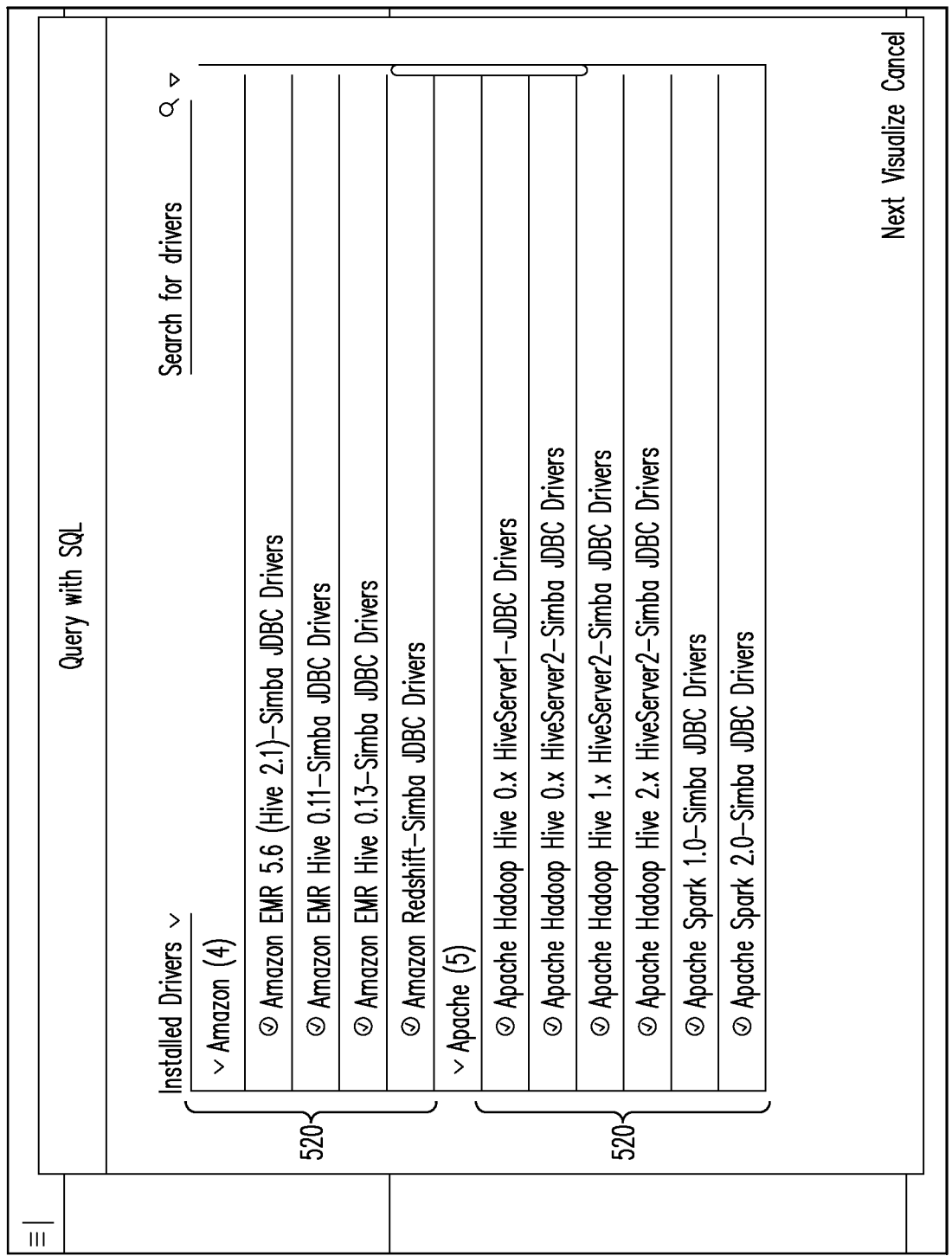
FIG. 8 is an outward view of a graphical interface according to some embodiments.

Then in S412, the BI tool 502 connects to the BI platform 950. In one or more embodiments, the BI tool 502 may include a separate log-in 604 to connect to and access the BI platform 950 or may automatically connect to and access the BI platform 950. For example, FIG. 7 provides a BI platform log-in user interface (UI) 700. The BI platform log-in UI 700 may include one or more user-input fields 702 associated with a respective category 704, including but not limited to Server 704a, SSO Authentication 704b, User Name 704c, Password 704d, and Authentication 704e. Other suitable categories 704 may be used. While the categories in FIG. 7 are shown with respective user-entry fields, it is noted that any of the user-entry fields may include drop-down menus 706 (e.g., associated with Authentication 704e), or be populated with other information. The BI platform log-in UI 700 may include a Remember Me control 708, to automatically connect the user in the future. The BI platform log-in UI 700 may also include a connect control 710 to connect the user to the BI platform 950.

The user may select an initiate query control 712 in S414. It is noted that the user may either connect to the BI platform firs or may select the "Query with SQL" control first, based on a preference set by the user. In embodiments, before selecting "Query with SQL," a connection may have been established or may be deferred until after selection. In one or more embodiments, Structured Query Language (SQL), or any other suitable language may be used to initiate the query to access and/or manipulate at least one of the data sources.

Figure 5:
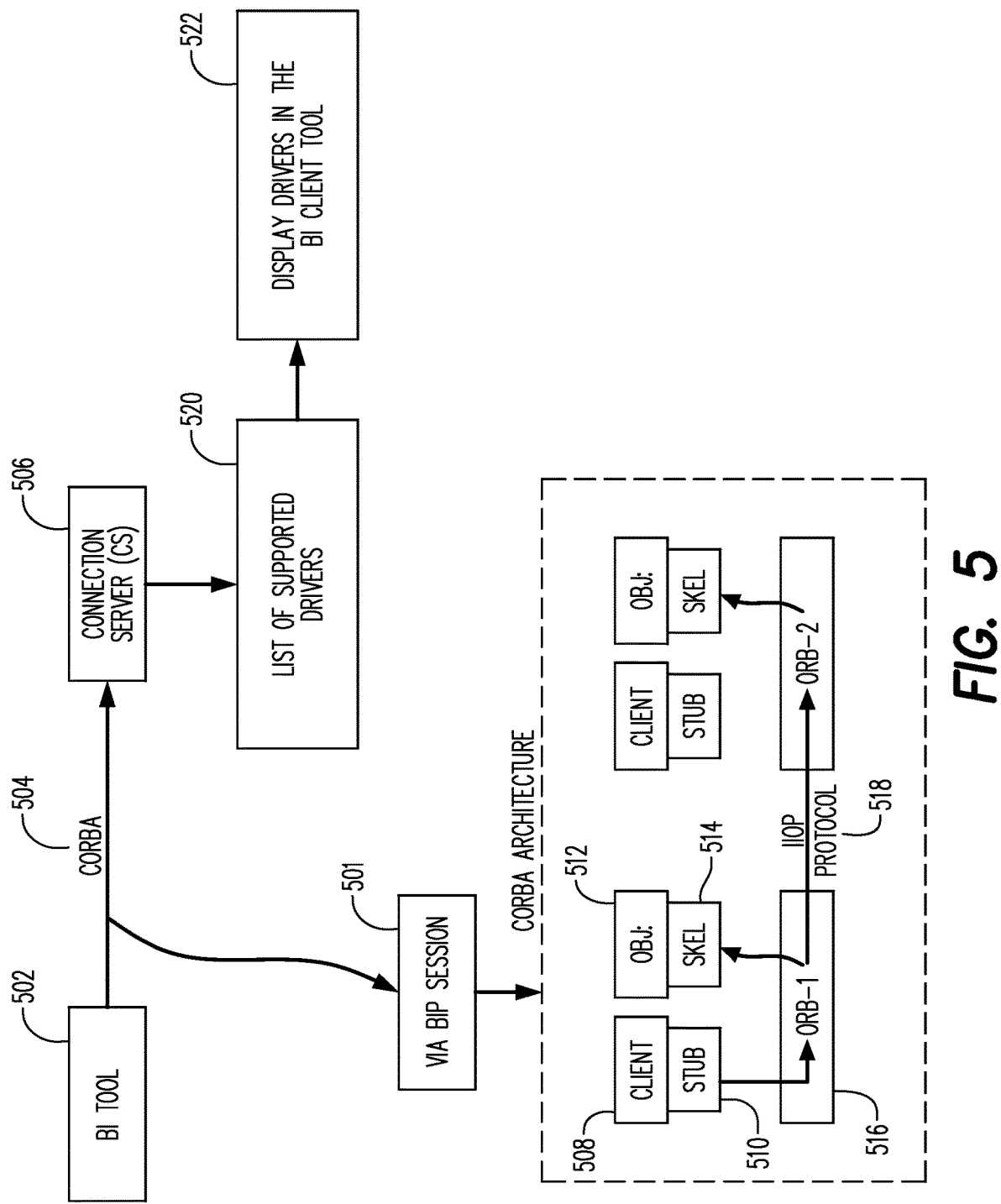
FIG. 5 is a block diagram of an architecture according to some embodiments.
Figure 6:
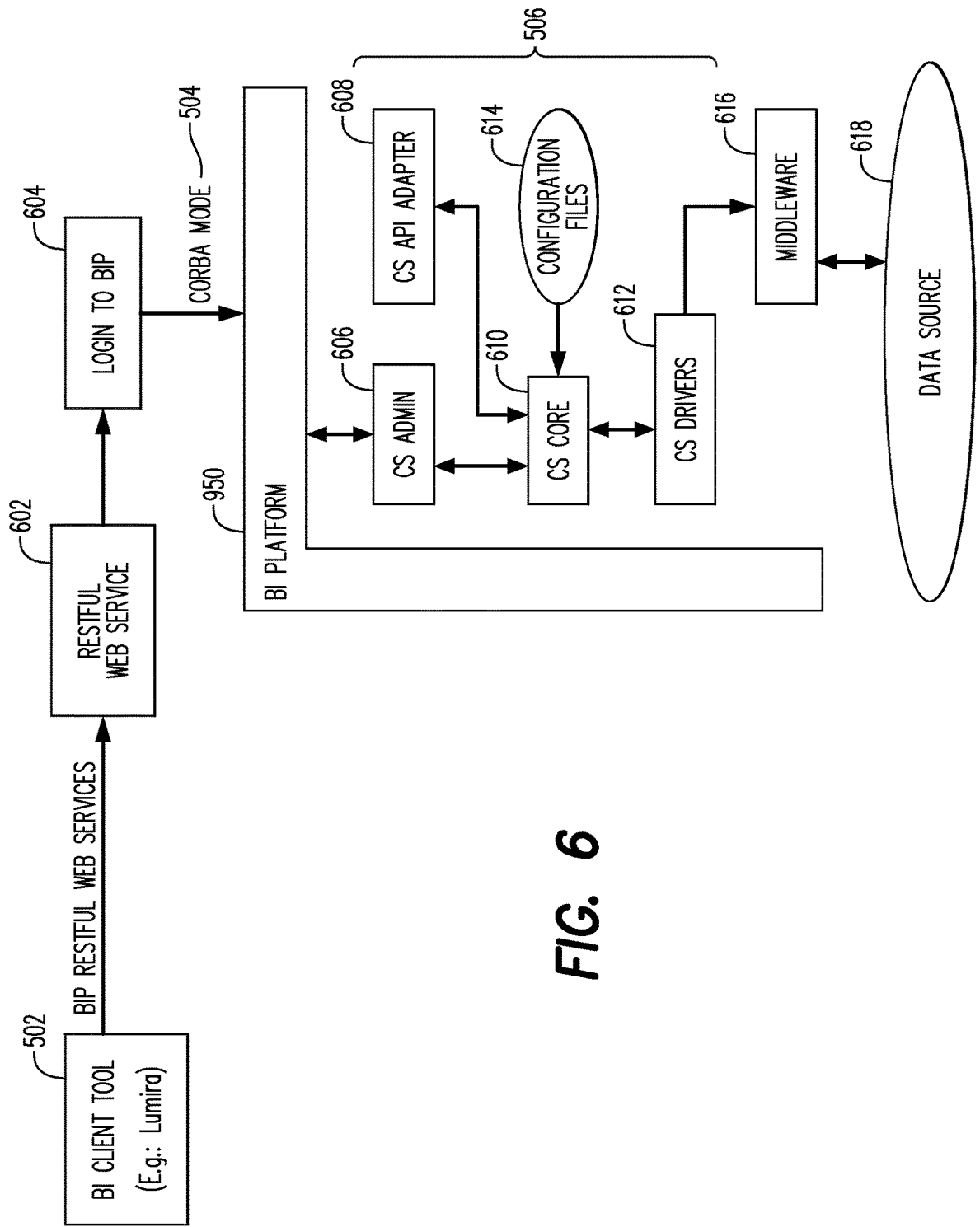
FIG. 6 is a block diagram of an architecture according to some embodiments.

In one or more embodiments, connection to the BI platform 950 may automatically trigger a CORBA mode 504 to connect to a Connection Server (CS) 506 that is integrated with the BI platform 950. As shown in FIG. 5, the CORBA mode 504, which may be accessed via a BIP session 501, may include a client 508, a stub 510, an object 512, a Skel 514, an Object Request Broker (ORB) 516, and an Internet Inter-ORB Protocol (IIOP) 518. CORBA uses an object-oriented model that enables collaboration between systems on different operating systems, programming languages and computing hardware. Data communication from client to server is accomplished through a well-defined object-oriented interface. The client 508 is the entity that wishes to perform an operation on the object 512 via a request. The ORB 516 is responsible for all of the mechanisms required to find the object implementation for the request, to prepare the object implementation to receive the request, and to communicate the data making up the request. The client 508 may use the stub 510 to make a request, via the ORB 516, as the stub 510 may present access operations on the object 512. The request may be received at the object 512 via a dynamic skeleton 514.

After the CORBA mode 504 connects to the CS 506, the CS 506 may retrieve one or more database drivers from a list of supported drivers 520 in 5416. As described above, each database driver 520 is a software component enabling an application to interact with a data source, such that each database driver corresponds to a given data source. To connect with an individual data source, the database driver 520 implements the version of a client-server protocol specific for the data source and exposes an application programming interface (API) which the BI tool may use to access the data source.

In one or more embodiments, the Connection Server (CS) 506 may be integrated with the BI platform 950. The CS 506 may be used to connect the BI tool 502 to different databases. The CS 506 may connect end-users to different databases with the help of data access drivers (i.e., database drivers). The CS 506 may maintain a connection to the database driver and data source 618 once the connection is made, (e.g., via a connection pool) so that the BI tool may use the same connection many times. In one or more embodiments, the CS 506 may be containerized as a run-time environment including one or more CS ADMIN 606 (CS administration files), a CS Application Programming Interface (API) adapter 608, a CS core 610, and one or more CS drivers 612. In one or more embodiments, the CS core 610 may be developed in both C++, Java with CORBA (middleware) architecture, or any other suitable language. The BI platform 950 may also include one or more configuration files 614 that provide for the CS 506 to be integrated with the BI platform 950.

In one or more embodiments, the CS API adapter of the CS 506 receives a request from the BI tool 502 to return the available database drivers 520 via the CORBA 504 access of the BI platform 950. The request is sent to the CS core 610, where the requested drivers are notified of the request to connect. The CS admin may manage the request sent from the client for connection to the drivers. The CS core 610 may transmit the request to one or more CS drivers 612, which in turn retrieves the one or more available database drivers 520 stored on the BI platform 950 via any suitable middleware 616.

Turning back to the process 400, in S418, the one or more database drivers 520 are returned to the BI tool 950, where they are displayed on the user interface 800 provided by the BI tool 502 in S420 (e.g., display drivers in the BI client tool 522). The user may then select at least one of the database drivers 520 to connect to its respective data source, where the data from the data source is provided to the user in response to the query.

FIG. 9 is a block diagram of system architecture 900 according to some embodiments. Embodiments are not limited to architecture 900 or to a three-tier database architecture.

Architecture 900 includes one or more databases 910, database management system (DBMS) 920, application server 930, applications 935, clients 940, BI platform 950, connection server 955 with CORBA 504, and one or more database drivers 520. Applications 935 may comprise server-side executable program code (e.g., compiled code, scripts, etc.) executing within application server 930 to receive queries from clients 940 and provide results to clients 940 based on data of database 910. As a non-exhaustive example, the BI tool 502 is an application 935.

Application server 930 provides any suitable interfaces through which clients 940 (e.g., end user) may communicate with applications 935 executing on application server 930. For example, application server 930 may include a HyperText Transfer Protocol (HTTP) interface supporting a transient request/response protocol over Transmission Control Protocol/Internet Protocol (TCP/IP), a WebSocket interface supporting non-transient full-duplex communications which implement the Web Socket protocol over a single TCP/IP connection, and/or an Open Data Protocol (OData) interface.

One or more applications 935 executing on server 930 may communicate with DBMS 920 using database management interfaces such as, but not limited to, Open Database Connectivity (ODBC) and Java Database Connectivity (JDBC) interfaces, via the BI Platform 950. These types of applications 935 may use Structured Query Language (SQL) to manage and query data stored in databases 910.

DBMS 920 serves requests to retrieve and/or modify data of database 910, and also performs administrative and management functions. Such functions may include snapshot and backup management, indexing, optimization, garbage collection, and/or any other database functions that are or become known. DBMS 920 may also provide application logic, such as database procedures and/or calculations, according to some embodiments. This application logic may comprise scripts, functional libraries and/or compiled program code.

Application server 930 may be separated from, or closely integrated with, DBMS 920. A closely-integrated application server 930 may enable execution of server applications 935 completely on the database platform, without the need for an additional application server. For example, according to some embodiments, application server 930 provides a comprehensive set of embedded services which provide end-to-end support for Web-based applications. The services may include a lightweight web server, configurable support for OData, server-side JavaScript execution and access to SQL and SQLScript.

Application server 930 may provide application services (e.g., via functional libraries) which applications 935 may use to manage and query the data of database 910. The application services can be used to expose the database data model, with its tables, hierarchies, views and database procedures, to clients. In addition to exposing the data model, application server 930 may host system services such as a search service.

Database 910 may store data used by applications 935. Database 910 may comprise any query-responsive data source or sources that are or become known, including but not limited to a structured-query language (SQL) relational database management system. Database 910 may comprise a relational database, a multi-dimensional database, an eXtendable Markup Language (XML) document, or any other data storage system storing structured and/or unstructured data. The data of database 910 may be distributed among several relational databases, dimensional databases, and/or other data sources. Embodiments are not limited to any number or types of data sources.

In some embodiments, the data of database 910 may comprise one or more of conventional tabular data, row-based data, column-based data, and object-based data. Moreover, the data may be indexed and/or selectively replicated in an index to allow fast searching and retrieval thereof. Database 910 may support multi-tenancy to separately support multiple unrelated clients by providing multiple logical database systems which are programmatically isolated from one another.

Database 910 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 940 may comprise one or more individuals or devices executing program code of a software application for presenting data on a user interface. Presentation of a user interface as described herein may comprise any degree or type of rendering, depending on the type of user interface code generated by application server 930.

For example, a client 940 may execute a Web Browser to request and receive a Web page (e.g., in HTML format) from an application 935 of application server 930 via HTTP, HTTPS, and/or WebSocket, and may render and present the Web page according to known protocols. One or more of clients 940 may also or alternatively present user interfaces by executing a standalone executable file (e.g., an .exe file) or code (e.g., a JAVA applet) within a virtual machine.

Figure 10:
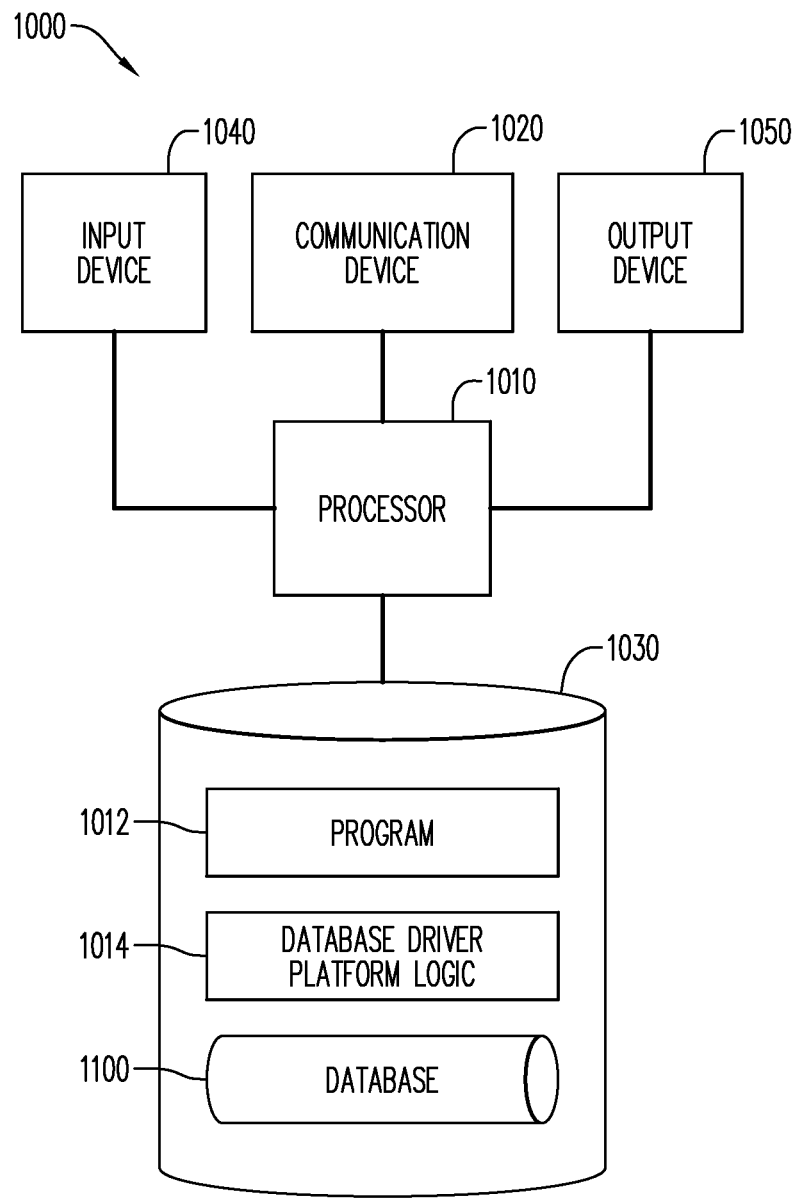
FIG. 10 is a block diagram of a system according to some embodiments.

FIG. 10 is a block diagram of apparatus 1000 according to some embodiments. Apparatus 1000 may comprise a general- or special-purpose computing apparatus and may execute program code to perform any of the functions described herein. Apparatus 1000 may comprise an implementation of one or more elements of system 900. Apparatus 1000 may include other unshown elements according to some embodiments.

Apparatus 1000 includes database driver processor 1010 operatively coupled to communication device 1020, data storage device 1030, one or more input devices 1040, one or more output devices 1050 and memory 1060. Communication device 1020 may facilitate communication with external devices, such as application server 930. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to manipulate graphical user interfaces and to input information into apparatus 1000. Output device(s) 1050 may comprise, for example, a display (e.g., a display screen) a speaker, and/or a printer.

Data storage device/memory 1030 may comprise any device, including combinations of magnetic storage devices (e.g., magnetic tape, hard disk drives and flash memory), optical storage devices, Read Only Memory (ROM) devices, Random Access Memory (RAM) etc.

The storage device 1030 stores a program 1012 and/or database driver platform logic 1014 for controlling the processor 1010. The processor 1010 performs instructions of the programs 1012, 1014, and thereby operates in accordance with any of the embodiments described herein, including but not limited to process 400.

The programs 1012, 1014 may be stored in a compressed, uncompiled and/or encrypted format. The programs 1012, 1014 may furthermore include other program elements, such as an operating system, a database management system, and/or device drivers used by the processor 1010 to interface with peripheral devices.

In some embodiments (such as the one shown in FIG. 10), the storage device 1030 further stores a database 1100.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
one or more data sources;
a memory storing processor-executable process steps; and
a processor to execute the processor-executable process steps to cause the system to:
  initiate a business intelligence (BI) tool;
  connect the BI tool to a connection server integrated with a BI platform, the connection using a middleware architecture and features of the BI platform, wherein connection of the BI tool to the BI platform automatically connects the BI tool to the connection server;
  receive selection of an initiate query control;
  retrieve, by the connection server, one or more database coupling components from the BI platform, wherein each database coupling component corresponds to a data source;
  display, at the BI tool, the retrieved one or more database coupling components; and
  receive selection of at least one of the retrieved one or more database coupling components to provide data in response to execution of a query.

2. The system of claim 1, wherein the one or more database coupling components are retrieved via a Common Object Request Broker Architecture (CORBA) mode.

3. The system of claim 1, wherein the one or more database coupling components are one of exclusive or shareable.

4. The system of claim 2, wherein the CORBA mode is at least one of language-independent, operating system-independent, and technology-independent.

5. The system of claim 2, wherein the CORBA mode is operative to access the CS via the BI platform.

6. The system of claim 5, wherein the CS includes at least one of a CS administrator, a CS application programming interface adapter, a CS core, one or more CS coupling components, and middleware.

7. The system of claim 6, wherein the CS core and one or more CS coupling components include configuration files.

8. The system of claim 1, wherein the connection to the BI platform is automatic.

9. A computer-implemented method comprising:
initiating a business intelligence (BI) tool;
connecting the BI tool to a connection server integrated with a BI platform, the connection using middleware architecture and features of the BI platform, wherein connection of the BI tool to the BI platform automatically connects the BI tool to the connection server;
receiving selection of an initiate query control;
retrieving, by the connection server, one or more database coupling components from the BI platform, wherein each database coupling component corresponds to a data source;
displaying, at the BI tool, the retrieved one or more database coupling components; and
receiving selection of at least one of the retrieved one or more database coupling components to provide data in response to execution of a query.

10. The method of claim 9, wherein the one or more database coupling components are retrieved via a Common Object Request Broker Architecture (CORBA) mode.

11. The method of claim 10, wherein the one or more database coupling components are one of exclusive or shareable.

12. The method of claim 11, wherein the CORBA mode is at least one of language-independent, operating system-independent, and technology-independent.

13. The method of claim 11, wherein a connection server (CS) is integrated with the BI platform, and the CORBA mode is operative to access the CS via the BI platform.

14. A non-transitory computer-readable medium storing program code, the program code executable by a computer system to cause the computer system to:
initiate a business intelligence (BI) tool;
connect the BI tool to a connection server integrated with a BI platform, the connection using a middleware architecture and features of the BI platform, wherein connection of the BI tool to the BI platform automatically connects the BI tool to the connection server;
receive selection of an initiate query control;
retrieve, by the connection server, one or more database coupling components from the BI platform via a Common Object Request Broker Architecture (CORBA) mode, wherein each database coupling component corresponds to a data source;
display at the BI tool the retrieved one or more database coupling components; and
receive selection of at least one of the retrieved one or more database coupling components to provide data in response to execution of a query.

15. The medium of claim 14, wherein the one or more database coupling components are one of exclusive or shareable.

16. The medium of claim 14, wherein the CORBA mode is at least one of language-independent, operating system-independent, and technology-independent.

17. The medium of claim 14, wherein a connection server (CS) is integrated with the BI platform, and the CORBA mode is operative to access the CS via the BI platform.

18. The medium of claim 17, wherein the CS includes at least one of a CS administrator, a CS application programming interface adapter, a CS core, one or more CS coupling components, and middleware.

* * * * *